United States Patent [19]

Cook

[11] Patent Number: 4,973,409
[45] Date of Patent: Nov. 27, 1990

[54] TREATMENT OF AQUEOUS SYSTEMS

[75] Inventor: Barry Cook, Manchester, England

[73] Assignee: Ciba-Geigy Corporation, Ardsley, N.Y.

[21] Appl. No.: 408,859

[22] Filed: Sep. 18, 1989

[30] Foreign Application Priority Data

Sep. 21, 1988 [GB] United Kingdom ............... 8822149

[51] Int. Cl.$^5$ .............................................. C02F 5/14
[52] U.S. Cl. .................................. 210/699; 210/698;
210/701; 252/180; 252/181; 422/15; 422/16; 422/17
[58] Field of Search ............................... 210/696–701;
252/180, 181, 389.2, 389.54, 396, 390;
422/15–19

[56] References Cited

U.S. PATENT DOCUMENTS

| | | | |
|---|---|---|---|
| 2,723,956 | 11/1955 | Johnson | 210/698 |
| 3,617,577 | 11/1971 | King | 210/698 |
| 3,715,307 | 2/1973 | Johnson et al. | 210/701 |
| 3,755,264 | 8/1973 | Testa | 210/701 |
| 4,126,549 | 11/1978 | Jones et al. | 210/701 |
| 4,223,120 | 9/1980 | Kurowsky | 210/701 |

FOREIGN PATENT DOCUMENTS

| | | | |
|---|---|---|---|
| 0032041 | 7/1981 | European Pat. Off. | |
| 0062718 | 10/1982 | European Pat. Off. | |
| 0276464 | 8/1988 | European Pat. Off. | |
| 1414918 | 11/1975 | United Kingdom | 210/701 |
| 2111040 | 6/1983 | United Kingdom | |

OTHER PUBLICATIONS

Japanese 71/019437-B (Derwent Abst. 71-36776S/21).

Primary Examiner—Peter Hruskoci
Attorney, Agent, or Firm—Luther A. R. Hall

[57] ABSTRACT

A method is shown of treating an aqueous system comprising adding to the system a water-soluble tri-copolymer having the formula I:

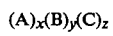

I or a salt thereof, wherein A is a group having the formula:

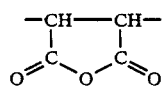

or a hydrolysed (dicarboxylic acid or salt) form of this group; B is a group having the formula:

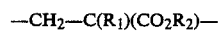

wherein $R_1$ is a hydrogen or methyl, and $R_2$ is hydrogen or $C_1$–$C_8$ straight- or branched chain alkyl, preferably methyl or ether, or $R_2$ is $C_1$–$C_8$ straight- or branched chain alkyl substituted by a group —$OR_3$ wherein $R_3$ is hydrogen or a group of formula —$[CH_2CH(R_4)O]_nH$ wherein $R_4$ is hydrogen or methyl and n is an integer from 1 to 10; C is a group having the formula:

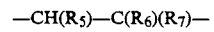

wherein $R_5$ is hydrogen, phenyl or $C_1$–$C_{18}$ straight- or branched chain alkyl, preferably hydrogen and $R_6$ and $R_7$, independently, are hydrogen, $C_1$–$C_{18}$ straight- or branched chain alkyl, phenyl or substituted phenyl, and x, y and z are integers, so chosen that (1) the molar ratio A of in the tri-copolymer ranges from 30 to 80% by weight; the molar ratio of B in the tri-copolymer ranges from 10 to 40% by weight; and the molecular ratio of C ranges from 10 tp 30% by weight; and (2) the molar weight of the tri-copolymer is within the range of from 600 to 10,000.

10 Claims, No Drawings

TREATMENT OF AQUEOUS SYSTEMS

The present invention relates to the treatment of aqueous systems, in particular to inhibit scale deposition from the aqueous system and/or to prevent fouling of the aqueous system and/or to inhibit corrosion of metals in contact with the aqueous system.

The majority of natural waters, and aqueous systems in general, contain dissolved salts of metals such as calcium, magnesium, barium and strontium. When the water or aqueous system is subjected to heating, the dissolved salts may be converted to insoluble salts and deposited as scale on heat transfer surfaces in contact with the water or aqueous system. If the water or aqueous system is concentrated even without heating, insoluble salts may also be precipitated.

Salt precipitation and scale deposition are troublesome and can cause increased cost to maintain aqueous systems in good working order. Among the problems caused by scale deposits are obstruction of fluid flow, impedance of heat transfer, wear of metal parts, shortening of equipment life, localised corrosion attack, poor corrosion inhibitor performance, and unscheduled equipment shutdown. These problems can arise in water or oil wells, water pipes, steam power plants, water desalination plants, reverse osmosis equipment utilising aqueous solutions, heat exchange equipment, and equipment concerned with the transport of products and by-products in aqueous media (e.g. fly ash formed during the combustion of coal in the production of electricity). The range of temperature over which these processes operate is wide, for example ambient temperatures are used for cooling water and elevated temperatures are used for steam power plants.

One method used to overcome the disadvantages associated with scale formation has involved the dismantling of equipment to enable the accumulated deposits to be cleaned out. This procedure is costly and does not prevent scale redeposition. Another method involves the use of strong alkali solution for the removal of, in particular, sulphate scale. It has been alleged that under suitable conditions of temperature and time the alkali treatment eventually provides an initial break up of the scale, which can then be removed by mechanical means. Such a method requires considerable time, and the removal of scale subsequent to treatment is often difficult.

There is therefore a need in this field for a composition which can be added to water or aqueous systems in very small quantities and which can cut down the rate at which insoluble salts are precipitated over a wide temperature range and also disperse those insoluble salts which are precipitated. Furthermore when any scale is formed, it should desirably be easily removeable from surfaces by simple mechanical means.

A number of additives have been proposed for addition to water or aqueous systems for these purposes, among them certain polyphosphates, and polycarboxylic acids.

The polyphosphates have the advantage that they ultimately give a soft friable scale which is easily removed from surfaces, whereas the use of certain polycarboxylic acids e.g. polyacrylic acids is disadvantageous in that there results a hard adherent eggshell-like scale.

However, where water-treatment processes involving heat are used, the temperatures are increasing, and since polyphosphate additives are readily hydrolysed at high temprature and as a result can give rise to the precipitation of insoluble calcium orthophosphate and other calcium phosphate, their usefulness is consequently limited.

Moreover, there are substantial number of commercial plants e.g. industrial boilers, cooling water systems, gas-scrubbing plants, slurry devices e.g. china clay slurry devices, in which it is important to maintain, in a suspended or dispersed state, various solid materials which are found in waters used in said plants. If such solids ceased to be suspended in the liquid, fouling of equipment may occur, e.g. in so-called "once-through" cooling systems. If there is a plentiful supply of water in close proximity to an industrial plant, cooling is often accomplished by passing the water through heat transfer equipment and then discharging the water back to its source. However, it is not feasible, from an economic standpoint, to filter the water conventionally due to the large quantities of water that are employed in this system. For this reason, formation of deposits readily occurs, whithin the plant, and it is normally necessary to stop the operation periodically for cleaning purposes. Moreover, corrosion of the plant leads to the deposition of iron oxides and/or iron salts which, if not carefully controlled, leads to blockage and mechanical failure of the plant.

Another problem area is the accumulation of silt and mud which collects in the bottoms of water storage tanks and ballast tanks of vessels and ships, thereby impairing the economy of maintenance and operation of the vessel.

Further, GB2 111 040 A teaches water-treating compositions comprising a water-soluble copolymer comprising (A) an addition reaction product of a glycidyl ether or ester with an $\alpha, \beta$-ethylenically unsaturated carboxylic acid and (B) another vinyl monomer. Such adducts containing glycidyl ethers or esters are not wanted in the present case.

We have now found certain tri-copolymer compounds having good scale-inhibiting properties, excellent particulate matter dispersion properties, as well as good general corrosion inhibiting properties in aqueous systems. The tri-copolymers also function as dispersing agents and/or anti-foulants towards common deposits, found in aquoues systems.

Accordingly, the present invention provides a method of treating an aqueous system comprising adding to the system a water-soluble tri-copolymer having the formula I:

$$(A)_x(B)_y(C)_z \qquad \text{I}$$

or a salt thereof, wherein A is a group having the formula:

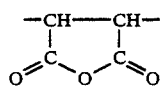

or a hydrolysed (dicarboxylic acid or salt) form of this group; B is a group having the formula:

$$-CH_2-C(R_1)(CO_2R_2)-$$

wherein $R_1$ is hydrogen or methyl, and $R_2$ is hydrogen or $C_1$-$C_8$ straight- or branched chain alkyl or $R_2$ is $C_1$–$C_8$ straight- or branched chain alkyl substituted by a group —$OR_3$ wherein $R_3$ is hydrogen or a group of formula —$[CH_2CH(R_4)O]_nH$ wherein $R_4$ is hydrogen or methyl and n is an integer from 1 to 10;

C is a group having the formula:

$$-CH(R_5)-C(R_6)(R_7)-$$

wherein $R_5$ is hydrogen, phenyl or $C_1$–$C_{18}$ straight- or branched chain alkyl and $R_6$ and $R_7$, independently, are hydrogen, $C_1$–$C_{18}$ straight- or branched chain alkyl, phenyl or substituted phenyl, preferably $R_6$ is hydrogen and $R_7$ is phenyl or $C_6$–$C_{12}$alkyl; and x, y and z are integers, so chosen that (1) the molar ratio of A in the tri-copolymer ranges from 30 to 80% by weight; the molar ratio of B in the tri-copolymer ranges from 10 to 40% by weight; and the molecular ratio of C ranges from 10 to 30% by weight; and (2) the molar weight of the tri-copolymer is within the range of from 600 to 10,000.

Salts of the tri-copolymeric compounds of formula I are compounds in which some or all of the acidic hydrogen atoms in the copolymeric compounds have been replaced by alkali metal ions, ammonium, ammonium ions or quaternized amine radicals.

Typical alkali metal ions are e.g. sodium and potassium ions.

Ammonium ions include e.g. trimethylammonium, triethylammonium, bis(2-hydroxyethyl)ammonium, tris(2-hydroxyethyl)ammonium and bis(2-hydroxyethyl)-2-(hydroxy-3-p-nonylphenoxy propyl ammonium ions.

Quaternized amine radicals include e.g. radicals having the formula:

$$N^{\oplus}(R_aR_bR_cR_d)_4 An^{\ominus},$$

wherein $R_a$, $R_b$, $R_c$ and $R_d$ are the same or different and each is $C_1$–$C_6$alkyl, especially methyl or ethyl, or 2-hydroxyethyl; or one of $R_a$, $R_b$, $R_c$ and $R_d$ is benzyl and the other three of $R_a$, $R_b$, $R_c$ and $R_d$ are $C_1$–$C_6$alkyl, especially methyl or ethyl; and $An^{\ominus}$ is halogen, especially chlorine or bromine, hydroxyl or sulfate.

$C_1$–$C_8$alkyl radicals $R_2$ include e.g. methyl, ethyl, isopropyl, sec.-butyl, tert.-butyl, n-butyl, n-pentyl, n-hexyl, n-heptyl and n-octyl n-radicals.

Preferred alkyl radicals $R_2$ include methyl and ethyl. $C_1$–$C_{18}$alkyl radicals $R_5$, $R_6$ or $R_7$ include e.g. methyl, ethyl, isopropyl, sec.-butyl, tert.-butyl, n-butyl, n-pentyl, n-hexyl, n-heptyl, n-octyl, n-nonyl, n-decyl, n-dodecyl, n-tetradecyl, n-hexadecyl and n-octadecyl groups.

Hydrogen for the radical $R_5$ is preferred.

When a $C_1$–$C_8$alkyl radical $R_2$ is substituted by a group —$OR_3$, such radicals include e.g. hydroxymethyl, 2-hydroxyethyl, 2-hydroxypropyl or polyethylene glycol groups.

When $R_6$ and/or $R_7$ are substituted phenyl groups, such groups are e.g. $C_1$–$C_4$-alkyl phenyl, hydroxyphenyl or phenylsulphonic acid groups.

The compounds of formula I are known compounds. They have been described, for instance, in Japanese patent application J71019437-B, as a component of a water-soluble resin composition for paints.

The tri-compolymers of formula I may be produced, in conventional manner, by copolymerizing (i) x moles of maleic anhydride;

(ii) y moles of acrylic acid, or a derivative thereof, having the formula II $$CH_2=C(R_1)CO_2R_2 \quad \text{II}$$

wherein $R_1$ and $R_2$ have their previous significance; and (iii) z moles of an olefin having the formula III:

$$R_5CH=C(R_6)(R_7) \quad \text{III}$$

wherein $R_5$, $R_6$ and $R_7$ have their previous significance.

Examples of comonomers II include acrylic acid, ethyl acrylate, methacrylic acid, methyl (meth)acrylate, hydroxymethyl acrylate and 2-hydroxyethyl acrylate, 2-hydroxypropylarylate.

Comonomers III include ethylene, propylene, isobutylene, but-1-ene, oct-1-ene, dec-1-ene, dodec-1-ene, styrene, α-methylstyrene, 4-hydroxystyrene, styrenesulphonic acid and stilbene.

The copolymerisation may be performed in a suitable solvent and in the presence of a reaction initiator. Suitable solvents include, dioxane, water, ketones such as 4-methylbutan-2-one, aromatic hydrocarbons such as toluene and xylene, aqueous alkanols e.g. aqueous ethanol and dioxan. Suitable reaction initiators are, e.g. materials which decompose under the reaction conditions to yield free radicals. Such materials include azo(-bis)isobutyronitrile, organic peroxides such as benzoyl peroxide, methylethyl ketone peroxide, ditertiary butyl peroxide and monobutyl hydroperoxide; and oxidising agents such as hydrogen peroxide, sodium perborate and sodium persulphate.

The products of this process for the purpose of isolation may be subjected to partial or complete evaporation under reduced pressure. The unpurified reaction products may be used as the tri-copolymeric products in the method of the invention. The reaction products may also be purified. The purification procedure may be (i) by evaporation of reaction solvent, dissolving the residue in water, washing with a water immiscible organic solvent e.g. ether and evaporation of the aqueous solution, (ii) by evaporation of reaction solvent, dissolving the residue in a suitable solvent such as 2-propanone and reprecipitation by addition of a non-solvent such as toluene.

When the reaction products are employed without purification, the ratio of reactants is important in that the activity of the product varies accordingly.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound of formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralisation and only the product of the invention need be added.

In practice, the amount of the compound of formula I used to treat the aqueous system may vary according to the protective function which the compound is required to perform.

For example, for corrosion-inhibiting protective treatments, optionally with simultaneous scale-inhibiting treatments, the amount of the compound of formula I added to the aqueous system may range from 0.1 to 50,000 ppm (0.00001 to 5% weight), preferably from 1 to 500 ppm (0.001 to 0.05% by weight), based on the weight of the aqueous system.

For solely anti-scale treatments, the amount of the compound of formula I added is conveniently from 1 to 200, preferably 1 to 30 ppm, based on the weight of aqueous system.

For most dilute aqueous dispersions to be treated, the amount of compound of formula I to be added as dispersant/antifoulant is conveniently from 1 to 200 ppm, preferably 2 to 20 ppm by weight. Aqueous slurries to be treated, however, may require much higher levels of compound of formula I e.g. from 0.1 to 5% by weight on total solids — which can be as high as 70% by weight of the total aqueous system.

When used to inhibit the deposition of scale and the precipitation of salts from aqueous solutions, the compounds of formula I, or salts thereof, are particularly effective in inhibiting deposition of scale-forming salts derived from calcium, magnesium, barium or strontium cations, and anions such as sulphate, carbonate, hydroxide, phosphate and silicate.

With respect to aqueous system which may be treated according to the present invention, of particular interest with respect to combined corrosion inhibition and anti-scale treatments are cooling water systems, steam generating systems, sea-water evaporators, reverse osmosis equipment, bottle washing plants, paper manufacturing equipment, sugar evaporator equipment, soil irrigation systems, hydrostatic cookers, gas scrubbing systems, closed circuit heating systems, aqueous-based refrigeration systems and down-well systems; for corrosion inhibition treatments alone, aqueous systems of particular interes include aqueous machining fluid formulations (e.g. for use in boring, milling, reaming, broaching, drawing, spinning, turning, cutting, sawing, grinding, and thread-cutting operations or in non-cutting shaping in drawing or rolling operations) aqueous scouring systems, engine coolants including water/glycol antifreeze systems, water/glycol hydraulic fluids; or solvent-based polymer systems, e.g. those containing tetrahydrofuran, ketones or alkoxyalkanols.

The inhibitor compound of formula I used according to the invention may be used alone, or in conjunction with other compounds known to be useful in the treatment of aqueous systems.

In the treatment of systems which are completely aqueous, such as cooling water systems, air-conditioning systems, steam-generating systems, sea-water evaporator systems, hydrostatic cookers and closed circuit heating or refrigerant systems, further corrosion inhibitors may be used such as, for example, water soluble zinc salts; phosphates; polyphosphates; phosphonic acids and their salts, for example, hydroxyethyl diphosphonic acid (HEDP), nitrilotris methylene phosphonic acid and methyamino dimethylene phosphonocarboxylic acids and their salts, for example, those described in German Offenlegungsschrift 2632774, hydroxyphosphonoacetic acid, 2-phosphonobutane-1,2,4-tri-carboxylic acid and those disclosed in GB No. 1572406; nitrates, for example, sodium nitrate; nitrites, e.g. sodium nitrite; molybdates, e.g. sodium molybdate, tungstates; silicates, e.g. sodium silicate; benzotriazole, bis-benzotriazole or copper deactivating benzotriazole or tolutriazole derivatives or their Mannich base derivatives; mercaptobenzotriazole; N-acylsarcosines; N-acylimino diacetic acids; ethanolamines; fatty amines; and polycarboylic acids, for example, polymaleic acid and polyacrylic acid, as well as their respective alkali metal salts, copolymers of maleic anhydride, e.g. copolymers of maleic anhydride and sulfonated styrene, copolymers of acrylic acid, e.g. copolymers of acrylic acid and hydroxyalkylated acrylic acid, and substituted derivatives of polymaleic and polyacrylic acids and their copolymers. Moreover, in such completely aqueous systems, the inhibitor used according to the invention may be used in conjunction with further dispersing and/or threshold agents, e.g. polymerised acrylic acid (or its salts), phosphino-polycarboxylic acids (as described and claimed in British Pat. No. 1458235), the cotelomeric compounds described in European patent application no. 0150706, hydrolysed polyacrylonitrile, polymerised meth-acrylic acid and its salts, polyacrylamide and copolymers thereof from acrylic and methacrylic acids, lignin sulphonic acid and its salts, tannin, naphthalene sulphonic acid/formaldehyde condensation products, starch and its derivatives, cellulose, acrylyic acid/lower alkyl hydroxy-acrylate copolymers, e.g. those described in U.S. Pat. No. 4029577, styrene/-maleic anhydride copolymers and sulfonated styrene homopolymers, e.g. those described in U.S. Pat. No. 4374733 and combinations thereof. Specific threshold agents, such as for example, 2-phosphonobutane-1,2,4-tri-carboxylic acid (PBSAM), hydroxyethyl diphosphonic acid (HEDP), hydrolysed polymaleic anhydride and its salts, alkyl phosphonic acids, hydroxyphosphonoacetic acid, 1-aminoalkyl-1,1-diphosphonic acids and their salts, and alkali metal polyphosphates, may also be used.

Particularly interesting additive packages are those comprising compounds of formula I with one or more of polymaleic acid or polyacrylic acid or their copolymers, or substituted copolymers, hydroxyphosphonoacetic acid, HEDP, PBSAM, triazoles such as tolutriazole, molybdates and nitriles.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones, e.g. polydimethylsiloxanes, diestearylsebac-amide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compoundsm chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, may be used.

If the system to be treated by the method of the invention is not completely aqueous, e.g. an aqueous machining fluid formulation, it may be e.g. a water dilutable cutting or grinding fluid.

The aqueous machining fluid formulations of the invention may be, e.g. metal working formulations. By "metal working", we mean reaming, broaching, drawing, spinning, cutting, grinding, boring, milling, turning, sawing, non-cutting shaping or rolling. Examples of water-dilutable cutting or grinding fluids into which the corrosion inhibiting combination may be incorporated include:

(a) aqueous concentrates of one or more corrosion inhibitors, and optionally one or more anti-wear additives, used at dilutions of 1:50 to 1:100, which are usually employed as grinding fluids;

(b) polyglycols containing biocides, corrosion inhibitors and anti-wear additives which are used at dilutions of 1:20 to 1:40 for cutting operations and 1:60 to 1:80 for grinding;

(c) semi-synthetic cutting fluids similar to (b) but containing in addition 10 to 25% oil with sufficient emulsifier to render the water diluted product translucent;

(d) an emulsifiable mineral oil concentrate containing, for example, emulsifiers, corrosion inhibitors, extreme pressure/anti-wear additives, biocides, anti-foaming agents, coupling agents etc; they are generally diluted from 1:10 to 1:50 with water to a white opaque emulsion;

(e) a product similar to (d) containing less oil and more emulsifier which on dilution to the range 1:50 to 1:100 gives a translucent emulsion for cutting or grinding operations.

For those partly-aqueous systems in which the aqueous system component is an aqueous machining fluid formulation the inhibitor of formula I used according to the invention may be used singly, or in admixture with other additives, e.g. known further corrosion inhibitors and/or extreme-pressure additives.

Examples of other corrosion inhibitors which may be used in these aqueous systems, in addition to the inhibitor composition used according to the invention, include the following groups:

(a) Organic acids, their esters or ammonium, amine, alkanolamine and metal salts, for example, benzoic acid, p-tert-butyl benzoid acid, disodium sebacate, triethanolamine laurate, iso-nonanoic acid, triethanolamine salt of (p-toluene sulphonamido caproic acid), triethanolamine salt of benzene sulphonamido caproic acid, triethanolamine salts of 5-ketocarboxylic acid derivatives as described in European Pat. No. 41927, sodium N lauroyl sarcosinate or nonyl phenoxy acetic acid;

(b) Nitrogen containing materials such as the following types: fatty acid alkanolamides; imidazolines, for example, 1-hydroxyethyl-2-oleyl-imidazolines, oxazolines; triazoles for example, benzotriazoles; or their Mannich base derivatives, triethanolamines; fatty amines; inorganic salts, for example, sodium nitrate; and the carboxy-triazine compounds described in European patent application No. 46139;

(c) Phosphorus containing materials such as the following types: amine phosphates, phosphonic acids or inorganic salts, for example, sodium dihydrogen phosphate or zinc phosphate;

(d) Sulphur containing compounds such as the following types: sodium, calcium or barium petroleum sulphonates, or heterocyclics, for example, sodium mercaptobenzothiazole.

Nitrogen containing materials, particularly triethanolamine, are preferred.

Examples of extreme pressure additives which may be present in the systems treated according to the present invention include sulphur and/or phosphorus and/or halogen containing materials, for instance, sulphurised sperm oil, sulphurised fats, tritolyl phosphate, chlorianted paraffins or ethoxylated phosphate esters.

When triethanolamine is present in the aqueous systems treated according to the present invention, it is preferably present in an amount such that the ratio of inhibitor composition to triethanolamine is from 2:1 to 1:20.

The aqueous surface-coating composition may be, e.g. a paint such as a styrene-acrylic copolymer emulsion paint, a resin, latex, or other aqueous based polymers surface-coating systems, to coat a metal substrate. The inhibitor composition used according to the invention may be employed to prevent flash rusting of the metal substrate during application of the surface coating and to prevent subsequent corrosion during use of the coated metal.

In aqueous surface-coating compositions may be used singly, or in admixture with other additives, e.g. known corrosion inhibitors, biocides, emulsifiers and/or pigments.

The further known corrosion inhibitors which may be used are, e.g. those of classes (a), (b), (c) and (d) hereinbefore defined.

Examples of biocides which may be used in these aqueous systems, in addition to the compound of formula I, include the following:

Phenols, and alkyl-and halogenated phenols, for example, pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of emulsifiers which may be used in these aqueous systems include e.g. alkyl sulphates, alkyl sulfonates, ether alcohol sulphates, di-n-alkylsulfo-succinates and polyoxyethylene nonylphenyl ethers.

Examples of pigments which may be used in these aqueous systems, in addition to the compound of formula I, include titanium dioxide, zinc chromate, iron oxide and organic pigments such as the phthalocyanines.

As already indicated tri-cotelomers of formula I also function as dispersing agents and/or antifoulants towards common deposits, e.g. iron oxides and/or iron salts, calcium and magnesium deposits, e.g. their carbonates, sulphates, oxalates and phosphates, and silt, alumina, silicates and clays found in such waters.

In particular, the method of the present invention may be applied to disperse deposits in an aqueous system containing 5-1500 ppm by weight of calcium ion as well as suspended solids. This aspect of the present invention finds particular use in the china clay industry in which it is important to obtain slurries which will not appreciably separate out during transportation from the clay pits to the user. At high concentrations of suspended solids in these slurries, the cotelomers of formula I have been found to disperse china clay and to be of value as "in-process" dispersants and as grinding aids.

The following Examples further illustrate the present invention. Examples 1 to 4 illustrate the preparation of tri-copolymers of formula I useful in the method of the invention. All parts and percentages are given by weight, unless stated otherwise.

EXAMPLE 1

A stirred solution of 49 parts by weight of maleic anhydride in 116 parts by weight of xylene is heated to reflux under a blanket of nitrogen gas.

To his solution are added, simultaneously over two hours:

(i) a co-monomer mixture of 25 parts by weight of ethyl acrylate and 26 parts by weight of styrene; and (ii) 2.45 parts by weight of di-tert-butylperoxide (DTBPO).

After completion of the addition, the heating under reflux conditions is maintained for a further two hours, the reaction mass then cooled to 90° C. and 200 parts by weight of water are added. The xylene is removed by azeotropic steam distillation to give 270 parts by weight of a pale yellow aqueous solution with a solids content of 28.9% having a maleic acid content of less than 0.1% and a weight average molecular weight of 3150.

EXAMPLE 2

Using the procedure described in Example 1, a tri-copolymer is produced from 65.4 parts by weight of maleic anhydride, 16.7 parts by weight of ethyl acrylate and 17.4 parts by weight of styrene using 3.27 parts by weight of DTBPO as catalyst.

300 parts by weight of the final product is obtained as an aqueous solution with a solids content of 43.7% and having a weight average molecular weight of 1290.

EXAMPLE 3

To a stirred solution of 70.6 parts by weight of maleic anhydride in 100 parts by weight of xylene heated under reflux conditions, under a nitrogen blanket, are added, simultaneously over 2 hours:

(i) a co-monomer mixture of 14 parts by weight of ethyl acrylate and 19.6 parts by weight of 1-decene.

(ii) a solution of 3.53 parts by weight of DTBPO in 16 parts by weight of xylene.

After completion of the addition, the heating under reflux conditions is maintained for a further 2 hours. The xylene is then removed, by distillation under reduced pressure to give 102.3 parts by weight of a pale yellow solid having a maleic acid content of less than 0.1% and a weight average molecular weight of 1900.

EXAMPLE 4

Using the procedure described in Example 1, a tri-copolymer produced from 73.5 parts of maleic anhydride, 25.0 parts of ethyl acrylate and 26.0 parts of styrene (molar ratio 3:1:1).

The product has a molecular weight of 1410.

EXAMPLE 5

Kaolin Dispersion Test

Test Conditions

Temperature 25° C.
pH 8.0
200 ppm Ca++ as $CaCO_3$
100 ppm $^-HCO_3$ as $CaCO_3$
10 ppm solid additive under test duration of test 4 hours.

100 ml of a suspension of kaolin in water (200 ppm Ca++ and 100 ppm $^-HCO_3$), which has been treated ultrasonically to disperse the particles of kaolin, is shaken with the test additive, in a 100 ml measuring cyclinder.

The degree of settling of the suspension after standing for 4 hours at 25° C. is assessed by measuring, using a turbidimeter the turbidity of the uppermost 40 ml of the suspension. The percentage efficiency of the additive, as a dispersant, is calculated by comparing the measured turbidity value with those of a freshly-shaken suspension, and with a 4-hour blank (control) suspension containing no additive.

$$\% \text{ Efficiency of additive} = \frac{F_a - F_b}{I_b - F_b} \cdot \frac{100}{1}$$

wherein
$F_a$ = final reading of additive
$F_b$ = final reading of blank
$I_b$ = inital reading of blank.

The product of Example 4 had a percentage efficiency in this test of 62%.

EXAMPLE 6

Seeded calcium carbonate threshold test

Test Conditions

Temperature 85° C.
Test duration 30 minutes
Seeds $CaCO_3$ (agragonite) 20 mg/100 ml
Calcium 125 ppm as $Ca^{++}$
Magnesium 375 ppm as $Mg^{++}$
Carbonate 182.2 ppm as $CO_3^{2-}$
Test additive 4 ppm solids.

The test is designated to assess the ability of a test additive to inhibit the precipitation of $CaCO_3$ under simulated desalination conditions. Seeding the test increases the severity of the test by encouraging crystallisation.

The seeds are placed in a clean glass bottle, and 50 ml of a sodium chloride/calcium chloride/magnesium chloride solution are added. To this are added 4 ppm of the test additive and then 50 ml of a sodium chloride/sodium carbonate solution. A clean bottle cap is fitted and a synthetic seawater test solution is shaken in a water bath at 85° C. for 30 minutes. After this time, the solution is filtered to remove any precipitated $CaCO_3$, and the filtrate is analysed for calcium content.

An additive's performance is assessed by how well it maintains calcium in solution and thus prevents $CaCO_3$ precipitation.

Activity is expressed as % $CaCO_3$ inhibition.

The product of Example 4 gave, in the above test, a % $CaCO_3$ inhibition of 89%.

What is claimed is:

1. A method of treating an aqueous system containing calcium ions and suspended soli to inhibit scale deposition, prevent fouling disperse said suspended solids, and inhibit corrosion of metals in contact therewith, which comprises adding to the system a water-soluble tri-copolymer having the formula I:

$(A)_x(B)_y(C)_z$
I or a salt thereof, wherein A is a group having the formula

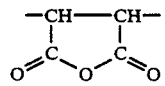

or a hydrolysed (dicarboxylic acid or salt) form of this group;
B is ethyl acrylate;
C is styrene or 1-decene, and
x, y and z are integers, so chosen that (1) the molar ratio of A in the tri-copolymer ranges from 30 to 80% by weight; the molar ratio of B in the tri-copolymer ranges from 10 to 40% by weight; and the molar ratio of C in the tri-copolymer ranges from 10 to 30% by weight; and (2) the weight average molecular weight of the tri-copolymer is within the range of from 600 to 10,000.

2. Method according to claim 1, wherein the aqueous system is treated to impart corrosion inhibition to metal surfaces in contact with the system, or is treated to impart corrosion inhibition to metal surfaces in contact with the system with simultaneous scale-inhibiting treatment and the amount of the tri-copolymer of formula I added is within the range of from 0.1 to 50,000 ppm, based on the weight of the aqueous system.

3. Method according to claim 2 wherein the amount of the tri-copolymer of formula I added is from 1 to 500 ppm, based on the weight of the aqueous system.

4. Method according to claim 1 wherein the aqueous system is treated solely to inhibit scale formation and the amount of the tri-copolymer of formula I added is from 1 to 200 ppm, based on the weight of the aqueous system.

5. Method according to claim 4 wherein the amount of the tri-copolymer of formula I added is from 1 to 30 ppm, based on the weight of aqueous system.

6. Method according to claim 1 wherein the aqueus system is a dilute aqueous dispersion to be treated for imparting dispersant/antifoulant protection, and the amount of the tri-copolymer of formula I added ranges from 1 to 200 ppm, based on the weight of the aqueous system.

7. Method according to claim 6 wherein the amount of the tri-copolymer added ranges from 2 to 20 ppm, based on the weight of the aqueous system.

8. Method according to claim 1 wherein the aqueous system is treated to inhibit deposition of scale-forming salts derived from calcium, magnesium, barium or strontium cations and sulphate, carbonate, hydroxide, phosphate and silicate anions.

9. Method according to claim 1 wherein the tri-copolymer of formula I is used alone or in combination with other compounds known to be useful in the treatment of aqueous systems.

10. Method according to claim 9 wherein the tri-copolymer of formula I is used together with one or more of polymaleic acid or polyacrylic acid or their copolymers, or substituted copolymers; hydroxyphosphonoacetic acid, hydroxyethyl diphosphonic acid; 2-phosphonobutane-1,2,4-tricarboxylic acid; a triazole; molybdate; and a nitrite.

* * * * *